United States Patent
Takahashi et al.

(10) Patent No.: US 8,660,337 B2
(45) Date of Patent: Feb. 25, 2014

(54) IMAGE PROCESSING APPARATUS, METHOD AND COMPUTER PROGRAM TO ADJUST 3D INFORMATION BASED ON HUMAN VISUAL CHARACTERISTICS

(75) Inventors: Shuichi Takahashi, Kanagawa (JP); Takanori Ishikawa, Saitama (JP); Isao Ohashi, Kanagawa (JP); Satoshi Shioiri, Miyagi (JP)

(73) Assignee: Sony Corporation, Tokyo (JP)

( * ) Notice: Subject to any disclaimer, the term of this patent is extended or adjusted under 35 U.S.C. 154(b) by 439 days.

(21) Appl. No.: 12/951,116

(22) Filed: Nov. 22, 2010

(65) Prior Publication Data

US 2011/0129144 A1    Jun. 2, 2011

(30) Foreign Application Priority Data

Nov. 27, 2009   (JP) ................................. 2009-270077

(51) Int. Cl.
    *G06K 9/00*    (2006.01)
(52) U.S. Cl.
    USPC ....................................................... 382/154
(58) Field of Classification Search
    None
    See application file for complete search history.

(56) References Cited

U.S. PATENT DOCUMENTS

| 5,751,927 | A | 5/1998 | Wason | |
|---|---|---|---|---|
| 2011/0285825 | A1* | 11/2011 | Tian et al. | 348/47 |
| 2012/0308155 | A1* | 12/2012 | Satoh et al. | 382/274 |

FOREIGN PATENT DOCUMENTS

| JP | 3749227 | 12/2005 |
|---|---|---|
| JP | 2001-238231 | 8/2010 |

OTHER PUBLICATIONS

Luft et al., Image enhancement by unsharp masking the depth buffer. Assoc for Computing Machinery, Inc. 2006;1206-1213.

* cited by examiner

*Primary Examiner* — Nirav G Patel
(74) *Attorney, Agent, or Firm* — Wolf, Greenfield & Sacks, P.C.

(57) ABSTRACT

An image processing apparatus includes: a depth information extraction means for extracting depth information from an input 3D image; a luminance extraction means for extracting luminance components of the 3D image; a contrast extraction means for extracting contrast components of the 3D image based on the luminance components; a storage means for storing a performance function indicating relation between the contrast components and depth amounts subjectively perceived, which is determined based on visual sense characteristics of human beings; and a contrast adjustment means for calculating present depth amounts of the inputted 3D image from the contrast components based on the performance function with respect to at least one of a near side region and a deep side region of the inputted 3D image which are determined from the depth information and adjusting contrast components of the inputted 3D image based on the calculated present depth amounts and a set depth adjustment amount.

11 Claims, 9 Drawing Sheets

FIG.7
<1cpd>
41
<2cpd>
42
<4cpd>
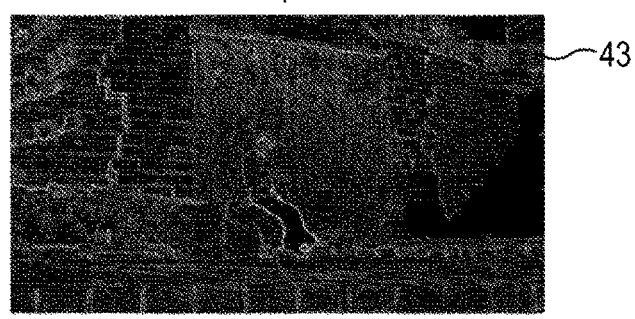
43
<8cpd>
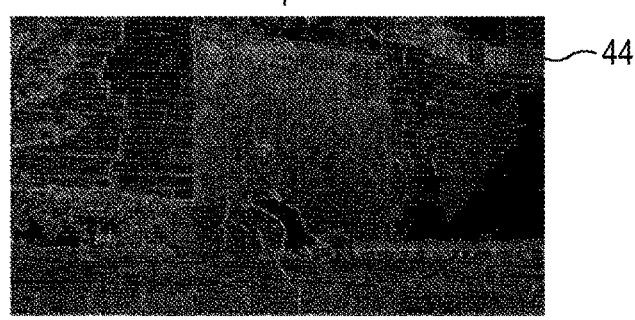
44

IMAGE PROCESSING APPARATUS, METHOD AND COMPUTER PROGRAM TO ADJUST 3D INFORMATION BASED ON HUMAN VISUAL CHARACTERISTICS

CROSS REFERENCE TO RELATED APPLICATIONS

This application claims priority under 35 U.S.C. §119 to Japanese Priority Patent Application JP 2009-270077, filed in the Japan Patent Office on Nov. 27, 2009, the entire contents of which are hereby incorporated by reference.

BACKGROUND OF THE INVENTION

1. Field of the Invention

The present invention relates to an image processing apparatus, an image processing method and a program, and particularly relates to an image processing apparatus, an image processing method and a program capable of providing 3D images with less sense of discomfort and uncomfortable feeling for human beings by adjusting parameters of monocular 3D information based on visual sense characteristics of human beings.

2. Description of the Related Art

As a method of displaying a 2D image on a 2D display and allowing a viewer to perceive the 2D image as a 3D image, there exists a method of presenting a 2D image for a left eye and a 2D image for a right eye in which binocular parallax (parallax between the left eye and the right eye) to the left and right eyes of the viewer respectively.

As information for allowing a human to perceive stereoscopic effect and depth of an object, there are binocular 3D information by both eyes and monocular 3D information by a single eye. A human perceives stereoscopic effect and depth of the object or space by combining the monocular 3D information and the binocular 3D information. As the binocular 3D information, for example, binocular parallax, horizontal convergence and the like can be cited. As the monocular 3D information, for example, shading, contrast, color, a spatial frequency, shielding relation and the like can be cited.

When stereoscopic effect and depth are desired to be enhanced in the case of displaying the 2D image on the 2D display and allowing the viewer to perceive the 2D image as the 3D image, for example, a method of increasing binocular parallax which is one of the binocular 3D information can be considered.

However, to increase the binocular parallax has the following problems in the light of an ocular structure and visual sense characteristics of human beings. That is, human eyeballs are normally in a parallel or a rather inward convergence state, therefore, when the binocular parallax is increased more than the distance between pupils, the eyeballs are in a divergence state in which both eyes are directed to the outside. The distance between pupils differs depending on the age or sex, therefore, a person having distance between pupils which is smaller than the normal distance is liable to be in the divergence state.

In the real world, sight lines of both eyes are directed to a gaze point as well as the focus of eyes is achieved on the point, therefore, distance of convergence of eyeballs corresponds to distance of adjustment thereof. However, when allowing the viewer to perceive the 3D image by the 2D image for the left eye and the 2D image for the right eye, the convergence can be adjusted on a position perceived as the 3D image, while the adjustment is focused on an image display surface, therefore, the distance by convergence of eyeballs does not corresponds to the distance by adjustment thereof. Accordingly, to emphasis stereoscopic effect and depth by increasing binocular parallax changes the distance by the convergence of eyeballs and the distance by the adjustment to a direction not correspond to each other, which may allow the viewer to perceive artificiality or to feel discomfort and visual fatigue.

In order to reduce uncomfortable feeling and visual fatigue, a method of adjusting the binocular parallax is proposed. For example, in a method proposed in Japanese Patent No. 3749227 (Patent Document 1), plural sample images in which binocular parallax is set to different values are presented and whether the presented images are permitted or not is allowed to be responded to adjust the binocular parallax.

However, when uncomfortable feeling and visual fatigue of the viewer are intended to be reduced, the binocular parallax is basically adjusted to a direction of reducing the stereoscopic effect and depth, therefore, realistic sensation and reality are reduced. Additionally, when stereoscopic effect and depth perceived by binocular 3D information are different from stereoscopic effect and depth perceived from monocular 3D information, the viewer may feel artificiality.

Therefore, it is not preferable that stereoscopic effect and depth sense of the 3D image are enhanced by increasing the binocular parallax.

On the other hand, a method of enhancing stereoscopic effect and depth sense by using monocular 3D information is also proposed. For example, in JP-A-2001-238231 (Patent Document 2), a method of changing characteristics of shading, shielding relation and a blurring state according to a depth position of an object in an image to enhance the depth sense is proposed.

SUMMARY OF THE INVENTION

However, in Patent Document 2, which parameter should be set to which value based on which calculation equation is not specifically disclosed. Even when the value is set by trial and error, it is not certified that an obtained 2D image for the left eye and a 2D image for the right eye are natural and comfortable for human beings, and they may rather the viewer to feel artificiality or uncomfortable feeling or they may cause visual fatigue.

In view of the above, it is desirable to provide 3D images with lesser sense of discomfort and uncomfortable feeling for human beings by adjusting parameters of monocular 3D information based on visual sense characteristics of human beings.

According to one embodiment of the invention, there is provided an image processing apparatus including a depth information extraction means for extracting depth information from an input 3D image, a luminance extraction means for extracting luminance components of the 3D image, a contrast extraction means for extracting contrast components of the 3D image based on the luminance components of the 3D image extracted by the luminance extraction means, a storage means for storing a performance function indicating relation between the contrast components of the 3D image and depth amounts subjectively perceived, which is determined based on visual sense characteristics of human beings and a contrast adjustment means for calculating present depth amounts of the inputted 3D image from the contrast components of the 3D image extracted by the contrast extraction means based on the performance function with respect to at least one of a near side region and a deep side region of the inputted 3D image which are determined from the depth information extracted by the depth information extraction means and adjusting contrast components of the inputted 3D image based on the calculated present depth amounts and a set depth adjustment amount.

According to one embodiment of the invention, there is provided an image processing method of an image processing apparatus storing a performance function indicating relation between contrast components of the 3D image and depth amounts subjectively perceived, which is determined based on visual sense characteristics of human beings and performing adjustment of depth sense of the inputted 3D image, which includes the steps of extracting depth information from the 3D image, extraction luminance components of the 3D image, extraction of contrast components of the 3D image based on the extracted luminance components of the 3D image, calculating present depth amounts of the inputted 3D image from the contrast components of the extracted 3D image based on the performance function with respect to at least one of a near side region and a deep side region of the inputted 3D image which are determined from the extracted depth information and adjusting contrast components of the inputted 3D image based on the calculated present depth amounts and the set depth adjustment amount.

According to one embodiment of the invention, there is provided a program allowing a computer to execute processing of extracting depth information from an inputted 3D image, extracting luminance components of the 3D image, extracting contrast components of the 3D image based on the extracted luminance components of the 3D image, calculating present depth amounts of the inputted 3D image which are subjectively perceived from the extracted contrast components of the 3D image based on a performance function indicating relation between contrast components of the 3D image and the depth amounts subjectively perceived, which is determined based on visual sense characteristics of human beings with respect to at least one of a near side region and a deep side region of the inputted 3D image which are determined from the extracted depth information, and adjusting contrast components of the inputted 3D image based on the calculated present depth amounts and a set depth adjustment amount.

According to the embodiments of the invention, depth information is extracted from the inputted 3D image, luminance components of the 3D image are extracted, contrast components of the 3D image are extracted based on the extracted luminance components of the 3D image, present depth amounts of the inputted 3D image which are subjectively perceived are calculated from the extracted contrast components of the 3D image based on the performance function indicating relation between contrast components of the 3D image and the depth amounts subjectively perceived, which is determined based on visual sense characteristics of human beings with respect to at least one of a near side region and a deep side region of the inputted 3D image which are determined from the extracted depth information, and contrast components of the inputted 3D image are adjusted based on the calculated present depth amounts and the set depth adjustment amount.

The image processing apparatus may be an independent apparatus as well as an internal block forming one apparatus.

According to the embodiments of the invention, the depth sense of the 3D image can be enhanced.

Also according to the embodiments of the invention, parameters of monocular 3D information are adjusted based on visual sense characteristics of human beings, thereby providing the 3D image with lesser sense of discomfort or uncomfortable feeling for human beings.

BRIEF DESCRIPTION OF THE DRAWINGS

FIG. 7 shows an example of spatial frequency component images obtained by visualizing the extraction results obtained by extracting respective spatial frequency components;

DESCRIPTION OF THE PREFERRED EMBODIMENTS

Hereinafter, modes for carrying out the invention (referred to as embodiments in the following description) will be explained. The explanation is made in the following order.

1. First Embodiment (an embodiment of changing depth sense by adjusting contrast)

2. Second Embodiment (an embodiment capable of adjusting contrast while reflecting user's preference)

1. First Embodiment

Configuration Block Diagram of an Image Processing Apparatus

Figure 1:
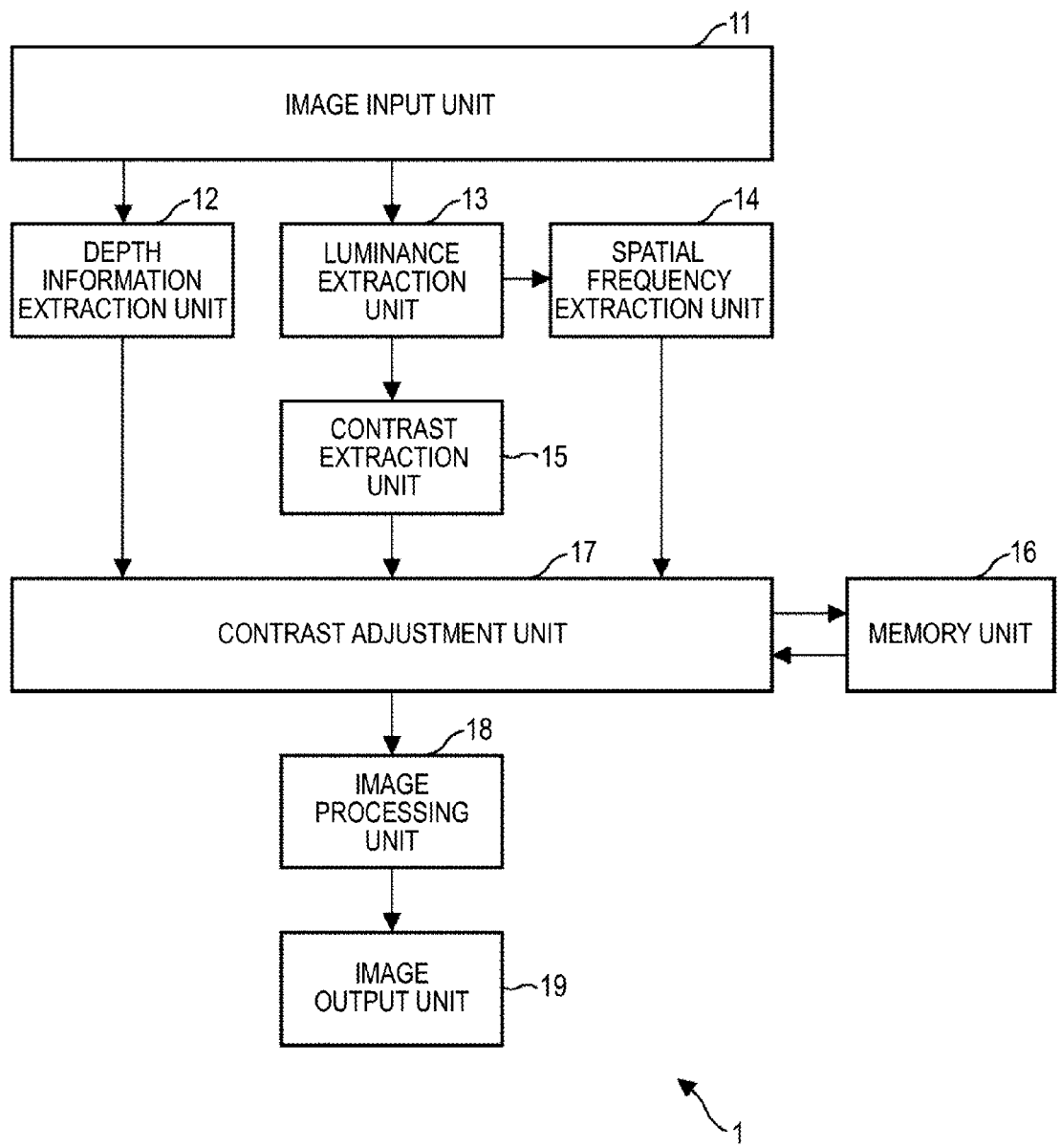
FIG. 1 is a block diagram showing a configuration example of an image processing apparatus according to a first embodiment of the invention.

FIG. 1 shows a configuration example of an image processing apparatus according to a first embodiment of the invention.

An image processing apparatus 1 includes an image input unit 11, a depth information extraction unit 12, a luminance extraction unit 13, a spatial frequency extraction unit 14, a contrast extraction unit 15, a memory unit 16, a contrast adjustment unit 17, an image processing unit 18 and an image output unit 19.

The image processing apparatus 1 performs processing of changing (adjusting) contrast of a 3D image with respect to the inputted 3D image for enhancing depth sense of the 3D image. Here, the 3D image indicates a 2D image for allowing a viewer to perceive the 3D image.

The image input unit 11 receives the 3D image from the outside and supplies the inputted 3D image to the depth information extraction unit 12 and the luminance extraction unit 13. There are various types of data formats in the 3D image inputted from the outside, however, the data format does not matter. As data formats for the 3D image, for example, there are a first data format in which the image is supplied as a stereoscopic image including an image for a left eye and an image for a right eye, a second data format in which the image is supplied as a format of a multi-viewpoint image including three or more plural viewpoint images, a third data format in which the image is supplied as a format of a 2D image and depth information thereof and so on. In the following description, when a word of "an image" or "a luminance image" is used as a processing target, the word means respective images for the left eye and the right eye in the first data format, respective plural viewpoint images in the second data format and the 2D image supplied with depth information in the third data format.

The depth information extraction unit 12 extracts depth information from the 3D image supplied from the image input unit 11. Specifically, when the 3D image is inputted in the first data format, the depth information extraction unit 12 calculates pixel misalignment of corresponding points in stereoscopic images, namely, binocular parallax, and approximately calculates depth information based on the calculated binocular information. The binocular parallax can be calculated by using methods such as a block matching method and a DP matching method.

When the 3D image is inputted in the second data format, the depth information extraction unit 12 calculates binocular parallax with respect to corresponding two viewpoint images in three or more viewpoint images and approximately calculates depth information from the calculated binocular parallax.

Furthermore, when the 3D image is inputted in the third data format, the depth information extraction unit 12 extracts the supplied depth information as the depth information is directly supplied.

The depth information extraction unit 12 supplies the depth information extracted from the 3D image to the contrast adjustment unit 17. The depth information is used as information for specifying a processing region in which contrast is adjusted.

In the present embodiment, the 3D image as the processing target from which depth information is extracted is supplied from the image input unit 11 to the depth information extraction unit 12 as described above, however, it is also preferable that the 3D image as a processing result of the luminance extraction unit 13 is supplied to the depth information extraction unit 12.

The luminance extraction unit 13 extracts luminance components of the 3D image supplied from the image input unit 11. For example, when the supplied image is represented by linear RGB values in the RGB color system, the luminance extraction unit 13 converts the values into a luminance value Y by the following equation (1) prescribed by ITU-R BT709 to thereby extract luminance components of the 3D image.

$$Y = 0.2126R + 0.7152G + 0.0722B \quad (1)$$

The image formed by luminance values Y of respective pixels is referred to as a luminance image. It is not always necessary that the image is represented by the format including RGB values (RGB signals), and when the image is represented by XYZ values in the CIE XYZ color system, the image formed by luminance values Y is referred to as the luminance image. The luminance value can be calculated (extracted) by methods other than the method of using the equation (1).

The spatial frequency extraction unit 14 extracts given spatial frequency components of the 3D image. For the extraction of spatial frequency components, for example, a method of using a Gabor filter can be applied. The Gabor filter approximates signal response characteristics in the visual system, and a function of the filter $g(x, y, \lambda, \theta, \psi, \sigma$ and $\gamma)$ is represented by an equation (2).

$$g(x, y, \lambda, \theta, \psi, \sigma, \gamma) = \exp\left(-\frac{(x\cos\theta + y\sin\theta)^2 + \gamma^2(-x\sin\theta + y\cos\theta)^2}{2\sigma^2}\right) \cos\left(2\pi\frac{x\cos\theta + y\sin\theta}{\lambda} + \psi\right) \quad (2)$$

In the equation (2), (x, y) represent coordinate values of a luminance image, $\lambda$ represents a wavelength corresponding to a spatial frequency, $\theta$ represents an orientation (direction), $\psi$ represents a phase, $\sigma$ represents dispersion of Gaussian distribution, and $\gamma$ represents an aspect ratio, respectively. The spatial frequency in this case is defined by tint variation (contrast) of white and black entering into a viewing angle of 1 degree of human eyes, and a unit thereof is "cpd (cycle per degree)".

For example, the spatial frequency extraction unit 14 extracts a region having the spatial frequency component of 1 cpd in the luminance image by convoluting the Gabor filter function $g(x, y, \lambda, \theta, \psi, \sigma$ and $\gamma)$ of the equation (2) in which $\lambda$ is the wavelength of 1 cpd with the luminance values Y of the luminance image extracted by the luminance extraction unit 13. When spatial frequency components of 2 cpd and 4 cpd in the luminance image are extracted, regions can be calculated by convoluting the Gabor filter function $g(x, y, \lambda, \theta, \psi, \sigma$ and $\gamma)$ in which $\lambda$ is the wavelength of 2 cpd or 4 cpd with the luminance values Y of the luminance image.

That is, it is found that which spatial frequency component is included in which region of the luminance image by convoluting the Gabor filter function $g(x, y, \lambda, \theta, \psi, \sigma$ and $\gamma)$ of the equation (2) in which $\lambda$ is a given wavelength of the spatial frequency with the luminance values Y of the luminance image extracted by the luminance extraction unit 13.

As the method of extracting the region having a given spatial frequency component of the luminance image, other methods other than the above can be applied as long as which component of the spatial frequency is included in which region of the luminance image can be found by the method. For example, the spatial frequency component may be extracted by using Fourier transform and the like. However, the spatial frequency components of the whole (region) of the luminance image to be transformed can be obtained in Fourier transform, therefore, it is difficult to extract the spatial frequency components in respective regions unless Fourier transform is performed by dividing the luminance image into given regions. On the other hand, it is found which spatial frequency component is included in which region all at once with respect to the whole luminance image to be processed when using the Gabor filter.

The processing of extracting the spatial frequency by the spatial frequency extraction unit 14 is necessary when a performance function to be applied in the contrast adjustment unit 17 is changed according to given spatial frequencies. Therefore, when the same performance function is applied to the whole luminance image in the contrast adjustment unit 17, the spatial frequency extraction unit 14 can be omitted.

The contrast extraction unit 15 extracts contrast components of the 3D image by using the luminance component of the 3D image extracted in the luminance extraction unit 13.

Specifically, the contrast extraction unit 15 determines a region of n×m pixel (n, m≥2) in horizontal×vertical as a unit for processing of extracting the contrast components. Then, the contrast extraction unit 15 moves the processing unit region from the upper left end of the luminance image in the Raster scan direction by the given number of pixels to thereby calculate Michelson contrasts C of plural processing unit regions.

The Michelson contrast C is defined by an equation (3).

$$C = \frac{L_{max} - L_{min}}{L_{max} + L_{min}} \qquad (3)$$

In the equation (3), $L_{max}$ represents the maximum value of the luminance values Y in the processing unit region and $L_{min}$ represents the minimum value of the luminance values Y in the processing unit region.

The size of the processing unit region is not particularly limited, however, the optimum size can be determined from the relation between the viewing angle and the number of pixels.

The movement amount (number of pixels) at the time of moving the processing unit region is not also particularly limited and can be optionally determined. Respective processing unit regions may be set so as to be overlapped at parts thereof or may be set in tiled patterns so as not to be overlapped. In the case of giving weight on the accuracy, that is, in the case of adjusting contrast to obtain smoother images, the processing unit region may be moved pixel by pixel.

The contrast extraction unit 15 supplies the Michelson contrasts C of respective processing unit regions calculated as contrast components of the 3D image to the contrast adjustment unit 17 with the luminance image.

The memory unit 16 stores performance functions obtained by quantifying the relation between the Michelson contrasts C and depth amounts D (also referred to as subjective depth amounts D) perceived subjectively by the contrast which have been obtained by visual experiments.

[Relation Between Michelson Contrasts C and Subjective Depth Amounts D]

Figure 2:
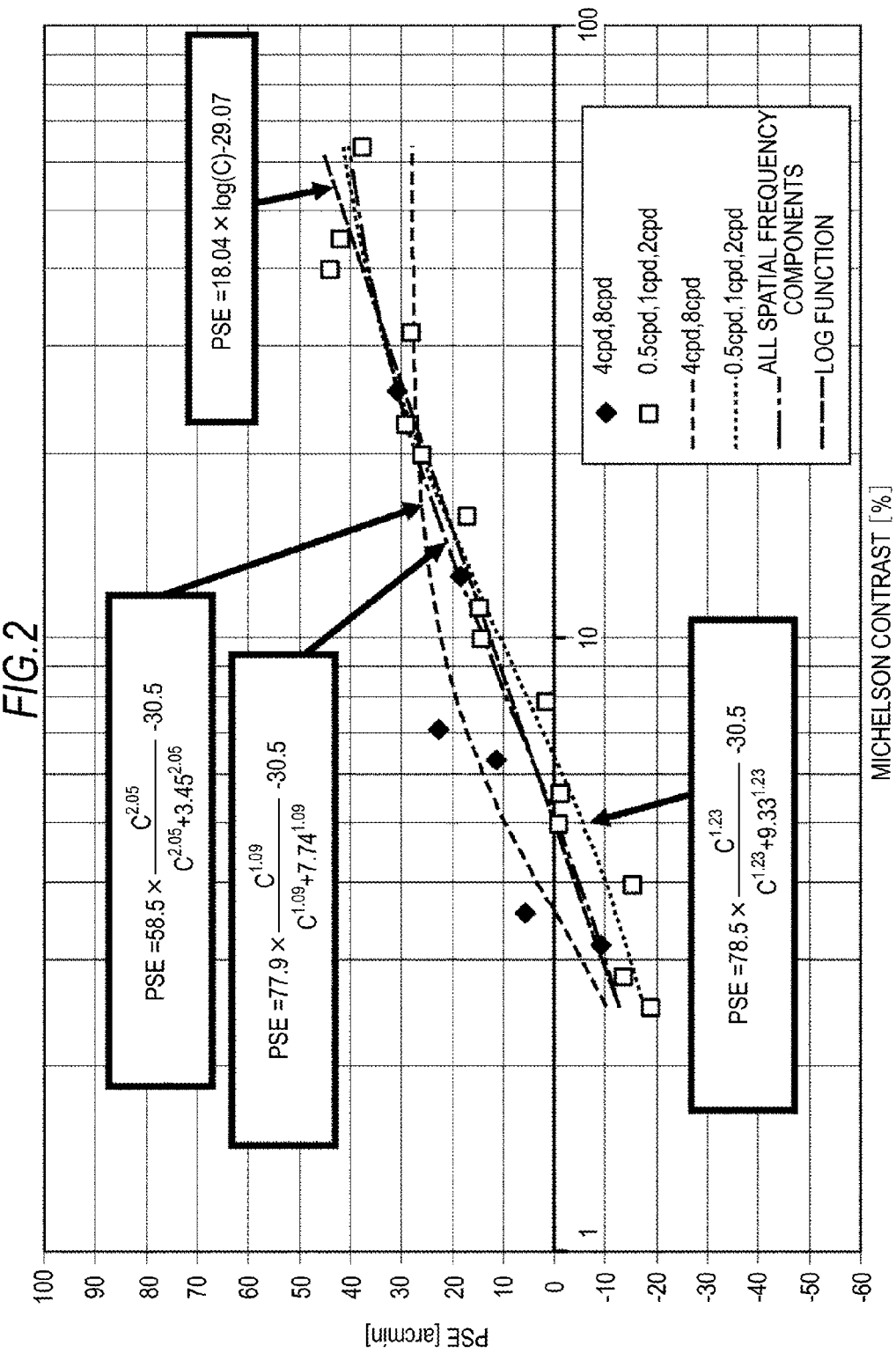
FIG. 2 shows performance functions obtained by quantifying relation between Michelson contrasts C obtained by visual experiments and depth amounts D substantially perceived by contrast.

FIG. 2 shows performance functions obtained by quantifying the relation between the Michelson contrasts C obtained by visual experiments and the subjective depth amounts D obtained at that time, which are plotted with a logarithm axis of Michelson contrasts as the horizontal axis and subjective depth amounts D as the vertical axis. A unit of the Michelson contrast C is [%] and a unit of the subjective depth amount D is (arc min: minute of angle).

In FIG. 2, squares (□) represent the relation between Michelson contrasts C and the subjective depth amounts D in luminance images spatial frequencies of which are 0.5 cpd, 1 cpd and 2 cpd. Rhombuses represent the relation between Michelson contrasts C and the subjective depth amounts D in luminance images spatial frequencies of which are 4 cpd and 8 cpd.

In the subjective depth amounts D, when a viewer feels that an object displayed on the display exists on the display, the value is 0 [arc min]. It is shown that, when the subjective depth amount D is a positive value, the viewer feels that the object exists at a front position of the display by the value, and when the subject depth amount D is a negative value, the viewer feels that the object exists at a deep position of the display.

For example, a plot of the square (□) exists at a position where the Michelson contrast C is 5 [o] and the subjective depth amount D is approximately 0 [arc min]. A plot of the square (□) also exists at a position where the Michelson contrast C is approximately 25 [%] and the subjective depth amount D is approximately 30 [arc min]. The example of these values express that the subjective depth amount D of the viewer is changed from approximately 0 [arc min] to approximately 30 [arc min] when the object the Michelson contrast C of which is [o] is changed to the object the Michelson contrast C of which is approximately 25 [%]. That is, it is shown that the viewer perceives that the object in the image exist at a position approximately 30 [arc min] nearer as compared with the position before the change when the Michelson contrast C of the object is changed from 5[%] to 25[%].

There is a monotone increasing relation between the Michelson contrast C and the subjective depth amount D, in which the subjective depth amount D is increased as the Michelson contrast C is increased as shown in FIG. 2. In other words, there is the relation in which the subjective depth amounts D are almost in proportion to logarithms of the Michelson contrasts C.

Accordingly, the relation between the Michelson contrast C and the subjective depth amount D can be represented by performing approximation with the performance function using logarithms D=A×log(C)+B (A, B are constant numbers). Specifically, when parameters A, B of D=A×log(C)+B in which a residual will be the minimum are calculated with respect to data of all spatial frequency components of 0.5 cpd, 1 cpd, 2 cpd, 4 cpd and 8 cpd, they can be represented by an equation (4).

$$D = 18.04 \times \log(C) - 29.07 \qquad (4)$$

That is, in the equation (4), A=18.04 and B=−29.07. In FIG. 2, the equation (4) is represented by a dotted line written as a "log function".

The relation between the Michelson contrast C and the subjective depth amount D can be expressed by being applied to the Naka-Rushton equation (performance function) which is used with respect to the response of a visual system. The Naka-Rushton equation can be expressed by the following equation (5).

$$D = D_{amp} \times \frac{C^n}{C^n + C_{50}^n} + D_{min} \qquad (5)$$

In the equation (5), $D_{amp}$, $D_{min}$, $C_{50}$ and "n" are given constant numbers, and $D_{amp}$ represents the maximum minimum width of the depth amount, $D_{min}$ represents the minimum value of the depth amount and $C_{50}$ represents a contrast value obtained when the depth amount is at the central value between the maximum value and the minimum value.

When the parameters $D_{amp}$, $D_{min}$, $C_{50}$ and "n" of the Naka-Rushton equation are calculated so that the residual will be the minimum with respect to data of the all spatial frequencies of 0.5 cpd, 1 cpd, 2 cpd, 4 cpd and 8 cpd obtained by the visual experiments, an equation (6) is obtained.

$$D = 77.9 \times \frac{C^{1.09}}{C^{1.09} + 7.74^{1.09}} - 30.5 \qquad (6)$$

That is, in the equation (6), $D_{amp}$=77.9 m, $D_{min}$=−30.5, $C_{50}$=7.74 and "n"=1.09. In FIG. 2, the equation (6) represents by a chain line.

For example, in the case that the Michelson contrast C of a certain luminance image is 10[%], when C=10 is substituted in the equation (6), the subjective depth amount D is 13.9[arc min]. Then, in order to double the subjective depth amount D, namely, in order to make the value be 27.8[arc min], reverse operation of the equation (6) is performed to make the Michelson contrast C of the luminance image be 20.9[%].

The performance functions to be applied can be distinguished according to given spatial frequencies. For example, the Naka-Rushton equation is applied as the performance function in FIG. 2, and when the performance functions are distinguished with respect to luminance images having spatial frequencies of 2 cpd or less and with respect to luminance images having spatial frequencies higher than 2 cpd, $D_{amp}$=78.5, $D_{min}$=−30.5, $C_{50}$=9.93 and n=1.23 can be obtained with respect to data of spatial frequency components of 2 cpd or less. Additionally, $D_{amp}$=58.5, $D_{min}$=−30.5, $C_{50}$=3.45 and n=2.05 can be obtained with respect to data of spatial frequency components higher than 2 cpd.

That is, the performance function of an equation (7) can be applied to luminance images having spatial frequencies of 2 cpd or less, and the performance function of an equation (8) can be applied to luminance images having spatial frequencies higher than 2 cpd.

$$D = 78.5 \times \frac{C^{1.23}}{C^{1.23} + 9.33^{1.23}} - 30.5 \quad (7)$$

$$D = 58.5 \times \frac{C^{2.05}}{C^{2.05} + 3.45^{2.05}} - 30.5 \quad (8)$$

Return to FIG. 1, the memory unit 16 stores part or all of the equation (4), the equation (6) and a pair of the equation (7) and the equation (8) obtained by visual experiments. That is, all of the equation (4), the equation (6) and a pair of the equation (7) and the equation (8) are stored in the memory 16 and may be used according to need or, only the performance functions determined to be applied in advance may be stored. When the calculation is performed by a computer, it is easy to perform calculation when using the equation (4) which is a logarithmic function. Additionally, the memory unit 16 may store equations of the performance functions directly as well as may store the performance functions in a form of a LUT (Look Up Table).

To the contrast adjustment unit 17, depth information of the 3D image is supplied from the depth information extraction unit 12, contrast components of the 3D image are supplied from the contrast extraction unit 15 and spatial frequency components of the 3D image is supplied from the spatial frequency extraction unit 14, respectively.

The contrast adjustment unit 17 changes (adjusts) the Michelson contrasts C of the luminance image to change (adjust) the depth sense of the 3D image. As explained with reference to FIG. 2, there is the monotone increasing relation between the Michelson contrast C and the subjective depth amount D, therefore, the contrast components of the luminance image may be adjusted so that the Michelson contrast C is increased when enhancing the depth sense of the 3D image.

A case in which the contrast adjustment unit 17 changes (adjusts) the Michelson contrasts C of the luminance image by using one performance function, for example, the performance function of the equation (6) with respect to the whole luminance image regardless of the spatial frequency will be explained.

For example, in the case that the Michelson contrast C of a certain one processing unit region of the luminance image is 10[%], when C=10 is substituted in the equation (6), the subjective depth amount D is 13.9[arc min]. Then, in order to double the subjective depth amount D, namely, in order to make the value be 27.8[arc min], the contrast adjustment unit 17 may change (adjust) the Michelson contrast C in the processing unit region to 20.9[%], which is 2.09 times of the 10[%].

A depth adjustment amount for determining by what value the subjective depth amount D is multiplied is set in the contrast adjustment unit 17 in advance. In order to double the subjective depth amount D, at least one of a process of changing a region existing at a near side in the luminance image to be nearer and a process of changing a region existing at a deep side in the luminance image to be deeper is necessary. That is, the direction of changing the contrast differs in the near side region and in the deep side region. The depth information supplied from the depth information extraction unit 12 supplied from the depth information extraction unit 12 is used for separating the luminance image to the deep side region and the near side region.

The contrast adjustment unit 17 determines the deep side region and the near side region of the 3D luminance image based on the depth information supplied from the depth information extraction unit 12. Here, the minimum unit of the region obtained by dividing the image into the deep side region and the near side region will be substantially equal to the processing unit region obtained by the contrast extraction unit 15 which calculates the Michelson contrasts C.

Next, the contrast adjustment unit 17 reads the performance function of the equation (6) stored in the memory unit 16. Then, the contrast adjustment unit 17 calculates the present subjective depth amounts D concerning all processing unit regions included in the deep side region and the near side region from the Michelson contrasts C. The subjective depth amount D with respect to the processing region after adjusting the contrast is determined from the calculated subjective depth amount D and the depth adjustment amount which has been previously set, therefore, the Michelson contrast C to be set can be calculated based on the performance function of the equation (6). That is, the contrast adjustment unit 17 calculates by what value the present Michelson contrast C is multiplied with respect to all processing unit regions based on the present subjective depth amount D and the depth information of the image. Here, assume that the adjustment amount of the calculated Michelson contrast C is M-times (M>0), when the depth amount perceived subjectively from the adjusted image is intended to be larger than the present image, the adjustment value is M<1 in the deep side region and M>1 in the near side region. When the depth among perceived substantially from the adjusted image is intended to be smaller than the present image, the adjustment value is M>1 in the deep side region and M<1 in the near side region.

In the above example, the present subjective depth amount D in the given processing unit region in the image at the near side region is calculated to be 13.9 [arc min], and it is found that the Michelson contrast C is preferably approximately doubled (M=2.09) for changing the subjective depth amount D to be doubled, namely, to be 27.8 [arc min].

Next, the contrast adjustment unit 17 adjusts contrast components of the 3D image so that the Michelson contrasts C are changed to values of M-times as calculated with respect to all processing unit regions included in the deep side region and the near side region.

Specifically, the contrast adjustment unit 17 performs Fourier transform in each processing unit region of the luminance image and calculates spectrum intensity of frequency components included in each processing unit region. Then, the contrast adjustment unit 17 adjusts spectrum intensity of respective frequency components in each processing unit region so that the Michelson contrasts C of each processing unit region after adjustment are changed to values of M-times. The spectrum intensity of respective frequency components in each processing unit region after adjustment is supplied to the image processing unit 18.

The image processing unit 18 generates the luminance image obtained after adjusting contrast based on the adjustment result by the contrast adjustment unit 17. Specifically, the image processing unit 18 performs inverse Fourier transform to the spectrum intensity of respective frequency components in each processing unit region after adjustment to thereby calculate the luminance image obtained after adjusting each processing unit region. Furthermore, the image processing unit 18 generates the luminance image after adjusting contrast from the luminance image in respective processing unit regions after adjustment. That is, when respective processing unit regions are set so as to be overlapped at parts thereof, plural luminance values after adjustment may be calculated with respect to each pixel of the luminance image. Accordingly, the image processing unit 18 generates the luminance image after adjusting contrast by applying an average value of plural luminance values after adjustment as the luminance value of the pixel after adjustment.

The image output unit 19 converts the luminance image generated by the image processing unit 18 into the 3D image which is the same as the image inputted to the image input unit 11, outputting the image to a device of a subsequent stage (a display device and the like). In the case of changing the luminance image represented by XYZ values in the CIE XYZ color system into the 3D image represented by RGB values in the RGB color system, conversion can be made by the following equations (9) to (11).

$$R = 3.2410X - 1.5374Y - 0.4986Z \quad (9)$$

$$G = -0.9692X + 1.8760Y + 0.0416Z \quad (10)$$

$$B = 0.0556X - 0.2040Y + 1.0570Z \quad (11)$$

When the data format at the time of outputting the 3D image is designated, the image output unit 19 may output the image after converting the data format of the 3D image into the designated format.

The image processing apparatus 1 of FIG. 1 is configured as described above.

In the above example, the Michelson contrast C of the near side region in the 3D luminance image is increased as well as the Michelson contrast C of the deep side region is reduced to thereby enhance the deep sense. However, it is also possible to enhance the deep sense by increasing only the Michelson contrast C of the near side region without changing the Michelson contrast C of the deep side region. Conversely, it is possible to enhance the deep sense by reducing only the Michelson contrast C of the deep side region without changing the Michelson contrast C of the near side region.

In the above example, the case in which the contrast adjustment unit 17 adjusts Michelson contrasts C of the luminance image by using one performance function of the equation (6) with respect to the whole luminance image has been explained, however, the case of making an adjustment by using the performance function of the equation (4) is the same as the above.

[Explanation of a Case in which Plural Performance Functions are Applied According to Given Spatial Frequency Components]

Next, a case in which the contrast adjustment unit 17 adjusts the Michelson contrasts C of the luminance image by applying two performance functions of the equations (7) and the formula (8) will be explained only concerning a point different from the above case in which one performance function is applied.

The contrast adjustment unit 17 determines which spatial frequency component is included at high rate in each processing unit region based on spatial frequency components of the 3D image extracted by the spatial frequency extraction unit 14.

When spatial frequency components of 2 cpd or less are included in the processing unit region at high rate, the contrast adjustment unit 17 reads the performance function of the equation (7) from the memory unit 16 and makes an adjustment of the Michelson contrast C in the same manner as in the case of applying the performance function of the equation (6) with respect to the processing unit region.

On the other hand, when spatial frequency components larger than 2 cd are included at high rate in the processing unit region, the contrast adjustment unit 17 reads the performance function of the equation (8) from the memory unit 16 and makes an adjustment of the Michelson contrast C in the same manner as in the case of applying the performance function of the equation (6) with respect to the processing unit region.

As described above, when the adjustment of the Michelson contrast C is made by applying plural performance functions, the performance function to be applied is selected in accordance with the spatial frequency components included in respective processing unit regions of the luminance image.

In the above example, the image is converted into the image having deeper depth to enhance the depth sense, however, it is naturally possible to convert the 3D luminance image so as to reduce the depth sense.

[Flowchart of Contrast Adjustment Processing]

Next, contrast adjustment processing performed by the image processing apparatus 1 will be explained with reference to a flowchart of FIG. 3. On the explanation of respective steps of FIG. 3, explanation will be made also with reference to FIG. 4 to FIG. 8 according to need.

First, in Step S11, the image input unit 11 receives input of a 3D image from the outside and supplies the image to the depth information extraction unit 12 and the luminance extraction unit 13. For example, the 3D image is inputted to the image input unit 11 from the outside in the above first to third data formats.

Figure 4:
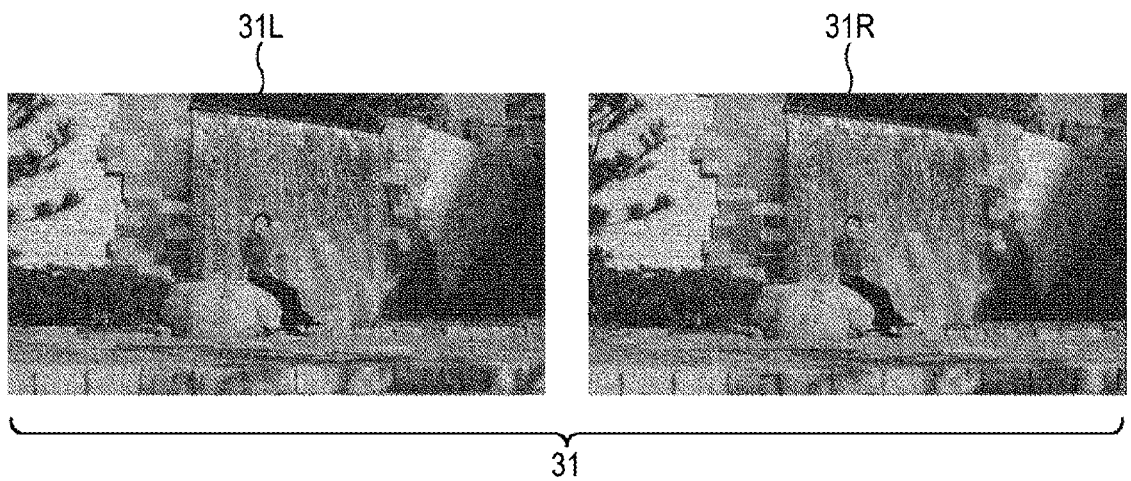
FIG. 4 shows an example of a 3D image when supplied in the first data format.

FIG. 4 shows an example of the 3D image when supplied in the first data format. That is, in the first data format, a 3D image 31 including an image for a left eye 31L and an image for a right eye 31R is inputted to the image input unit 11. The binocular parallax is set between the image for the left eye 31L and the image for the right eye 31R. The 3D image 31 is the 3D image obtained by recording a situation in which a woman seats herself on a big stone against a background of an artificial waterfall.

In Step S12, the depth information extraction unit 12 extracts depth information from the 3D image supplied from the image input unit 11. As described above, the depth information may be extracted from a 3D luminance image obtained by extracting luminance components by the luminance extraction unit 13.

When data of the 3D image is supplied in the first or the second data format, the depth information extraction unit 12 calculates pixel misalignment of corresponding points in stereoscopic images or viewpoint images, namely, the binocular parallax by using the methods such as the block matching method and the DP matching method, and approximately calculates the depth information based on the calculated binocular parallax.

On the other hand, when the 3D image is supplied in the third data format, the depth information extraction unit 12 extracts the supplied depth information as the depth information is directly supplied. The depth information extraction unit 12 supplies the extracted depth information to the contrast adjustment unit 17.

Figure 5:
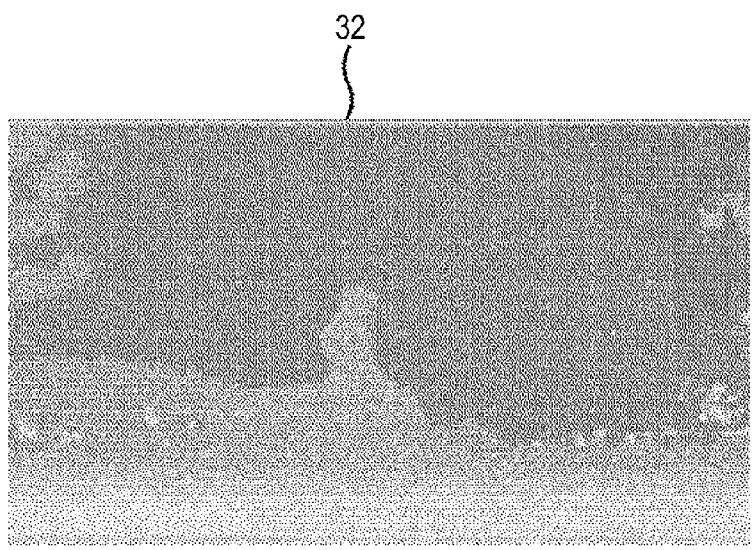
FIG. 5 shows an example of a depth image obtained by visualizing depth information extracted from the 3D image.

FIG. 5 shows a depth image 32 obtained by visualizing depth information extracted with respect to the 3D image 31 including the image for the left eye 31L and the image for the right eye 31R shown in FIG. 4.

In the depth image 32 of FIG. 5, the depth information is represented by 8-bit values, and an object positioned at the deep side in the 3D image 31 is represented by small pixels value and an object positioned at a near side is represented by large pixel values. The depth image 32 shown in FIG. 5 is for explaining extraction processing of depth information in step S12 and the depth image 32 is not directly used in the contrast adjustment processing of FIG. 3.

When referring to the depth image 32 of FIG. 5, pixels of a woman and the stone on which the woman sits are brighter than pixels of the artificial waterfall of the background (pixel values are larger). Therefore, the depth information accurately expresses that the artificial waterfall is the background and that the woman and the big stone are the foreground.

In Step S13, the luminance extraction unit 13 extracts luminance components of the 3D image supplied from the image input unit 11. For example, when the supplied 3D image is expressed by linear RGB values in the RGB color system, the luminance extraction unit 13 extracts luminance components of the 3D image by converting the RGB values of the 3D image into luminance values Y by using the above equation (1).

Figure 6:
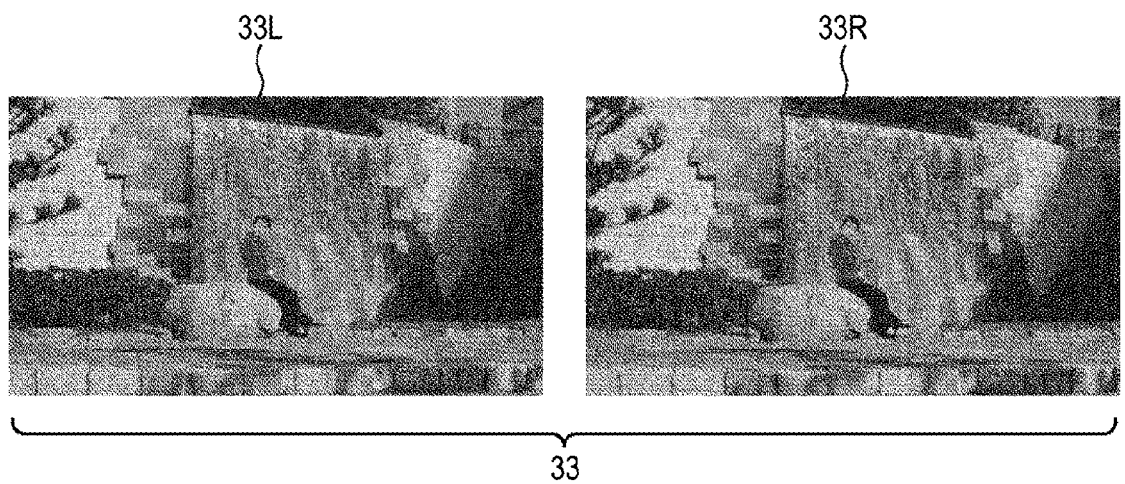
FIG. 6 shows an example of a luminance image generated by extracting luminance components.

FIG. 6 shows a luminance image 33 including a luminance image for a left eye 33L and a luminance image for a right eye 33R generated by extracting luminance components from the image for the left eye 31L and the image for the right eye 31R shown in FIG. 4 respectively. In the drawing, the difference between the 3D image 31 and the luminance image 33 does not appear because of constraints thereof, however, the 3D mage 31 is a color image and the luminance image 33 is a gray image.

In Step S14, the spatial frequency extraction unit 14 extracts given spatial frequency components of the 3D image. In other words, the spatial frequency extraction unit 14 detects which spatial frequency component is included in which region of the 3D image.

FIG. 7 shows spatial frequency component images obtained by visualizing the extraction results at the time of extracting respective spatial frequency components of 1 cpd, 2 cpd, 4 cpd and 8 cpd from the luminance image for the left eye 33L shown in FIG. 6.

The spatial frequency is defined by tint variation (contrast) of white and black entering into a viewing angle of 1 degree of human eyes as described above, therefore, the spatial frequency depends on the distance between the user who views the 3D image and the display and the size of (the 3D image displayed on) the display. In the example, the spatial frequency is calculated under a condition that the user views the display having the size of 40-inch and resolution of 1920× 1080 at the distance of 3H (H is the display height).

A spatial frequency component image 41 of FIG. 7 is a spatial frequency component image obtained by visualizing the extraction result when the spatial frequency component of 1 cpd was extracted with respect to the luminance image for the left eye 33L.

A spatial frequency component image 42 of FIG. 7 is a spatial frequency component image obtained by visualizing the extraction result when the spatial frequency component of 2 cpd was extracted with respect to the luminance image for the left eye 33L.

A spatial frequency component image 43 of FIG. 7 is a spatial frequency component image obtained by visualizing the extraction result when the spatial frequency component of 4 cpd was extracted with respect to the luminance image for the left eye 33L.

A spatial frequency component image 44 of FIG. 7 is a spatial frequency component image obtained by visualizing the extraction result when the spatial frequency component of 8 cpd was extracted with respect to the luminance image for the left eye 33L.

In the spatial frequency component images 41 to 44, the higher the intensity of each spatial frequency component is, the brighter (higher the pixel values) the pixels are.

The processing of Step S14 can be omitted when the Michelson contrasts C of the luminance image are adjusted by using one function performance with respect to the whole luminance image.

In Step S15, the contrast extraction unit 15 extracts contrast components of the 3D image by using luminance components of the 3D image extracted by the luminance extraction unit 13. Specifically, the contrast extraction unit 15 calculates the Michelson contrasts C of respective processing unit regions while moving the processing unit region by a given amount with respect to the luminance image, thereby calculating the Michelson contrast C over the whole luminance image.

In Step S16, the contrast adjustment unit 17 determines a deep side region and a near side region based on depth information supplied from the deep information extraction unit 12.

In Step S17, the contrast adjustment unit 17 reads the performance function from the memory unit 16. When the contrast components are adjusted by applying one performance function with respect to the whole luminance image, the performance function of the equation (4) or the equation (6) is read out. When the contrast components are adjusted by applying two performance functions with respect to the whole luminance image, the performance functions of the equation (7) and the equation (8) are read out.

In Step S18, the contrast adjustment unit 17 calculates the present subjective depth amounts D from the Michelson contrasts C with respect to the whole processing unit regions. The subjective depth amounts D with respect to the processing regions after adjusting the contrast are determined by the calculated present subjective depth amounts D, the Michelson contrasts C which should be set can be calculated based on the performance function read from the memory unit 16. That is, the contrast adjustment unit 17 calculates by what value the present Michelson contrast C is multiplied based on the present subjective depth amount D and depth information of the image with respect to all processing unit regions. Assume that the adjustment value of the calculated Michelson contrast C is M-times.

Here, plural performance functions are applied according to given spatial frequency components, the contrast adjustment unit 17 determines which spatial frequency component is included at high rate in the processing unit region of the luminance image based on the spatial frequency components of the 3D image extracted in Step S14. Then, the contrast adjustment unit 17 calculates the Michelson contrast C to be set in each processing unit region by using the performance function corresponding to the spatial frequency component determined at high rate in performance functions read from the memory unit 16 in Step S17.

On the other hand, when one performance function such as the equation (4) or the equation (6) is applied with respect to the whole luminance image, the contrast adjustment unit 17 calculates the Michelson contrast C to be set in each processing unit region by using one performance function read from the memory unit 16 in Step S17.

In Step S19, the contrast adjustment unit 17 adjusts the contrast components C so that the Michelson contrasts C are changed to values of M-times as calculated with respect to all processing unit regions included in the deep side region and the near side region. Specifically, the contrast adjustment unit 17 performs Fourier transform in each processing unit region of the luminance image and calculates frequency components and spectrum intensity included in each processing unit region. Then, the contrast adjustment unit 17 adjusts the spectrum intensity of respective frequency components in each processing unit region so that the Michelson contrasts C of each processing unit region after adjustment are changed to values of M-times. The spectrum intensity of respective frequency components of each processing unit region after adjustment is supplied to the image processing unit 18.

In Step S20, the image processing unit 18 generates the luminance image after adjusting contrast based on the adjustment result by the contrast adjustment unit 17. Specifically, the image processing unit 18 performs inverse Fourier transform to the spectrum intensity of respective frequency components in each processing unit region after adjustment to thereby calculate the luminance image obtained after adjusting each processing unit region. Then, the image processing unit 18 generates the luminance image after adjusting contrast from the luminance image obtained after adjusting each processing unit region.

In Step S21, the image output unit 19 outputs the 3D image obtained after adjusting contrast to a device of a subsequent stage such as a display device. That is, the image output unit converts the luminance image generated by the image processing unit 18 to the 3D image which is the same as the image inputted in the pixel input unit 11 and outputs the image to the subsequent device. The image output unit 19 may convert the data format of the 3D image generated by the image processing unit 18 to another format and output the image according to need.

The processing from Step S11 to Step S21 is executed repeatedly every time the 3D image is inputted to the image input unit 11.

The order of executing respective processing of Steps S11 to S21 is not limited to the above example and can be changed if necessary. For example, Step S12 and Step S13 can be executed in parallel in the processing of Steps S11 to S21. Step S14 and Step S15 can be also executed in parallel.

2. Second Embodiment

Configuration Block Diagram of the Image Processing Apparatus

Figure 8:
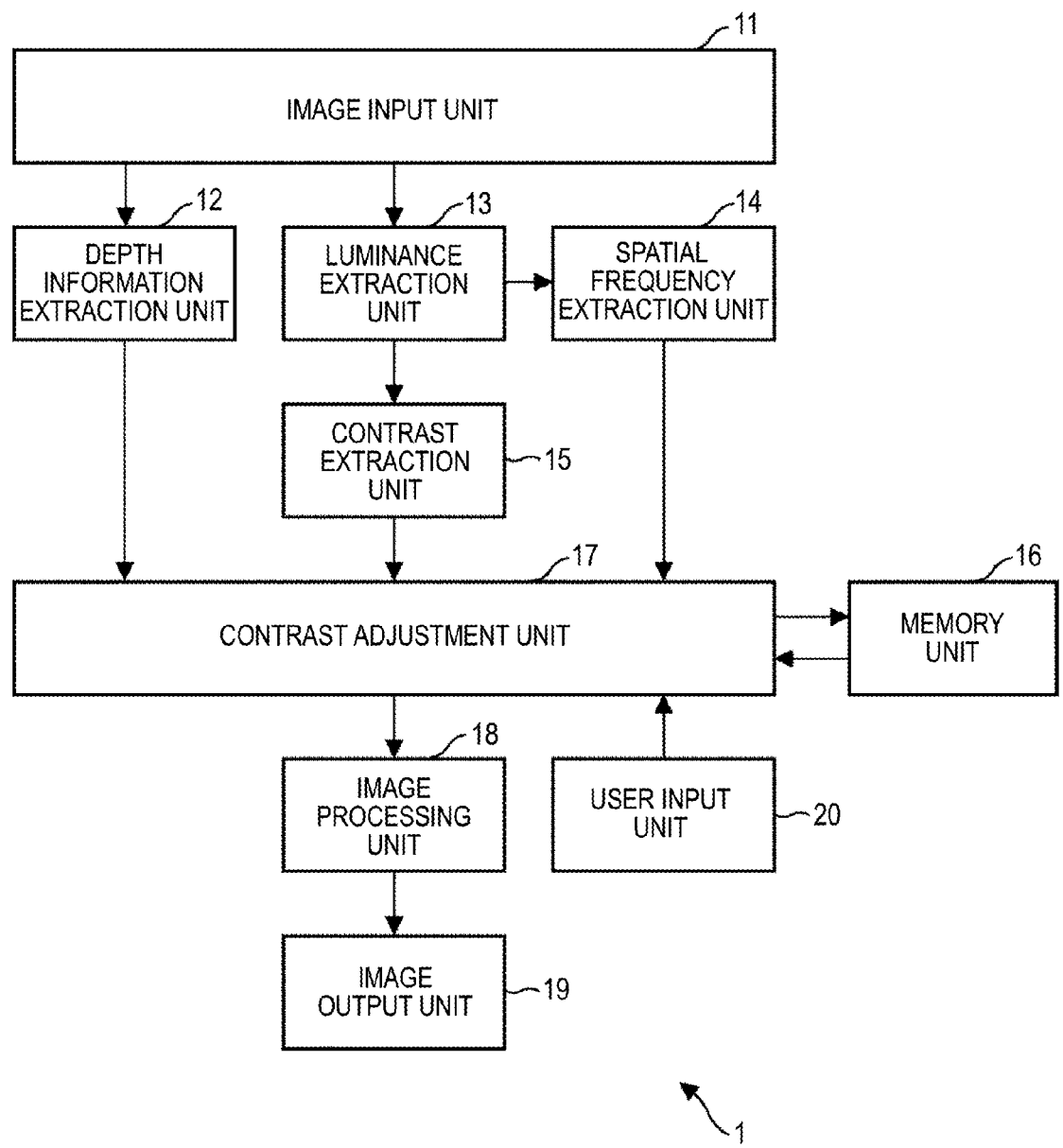
FIG. 8 is a block diagram showing a configuration example of an image processing apparatus according to a second embodiment of the invention.

FIG. 8 shows a configuration example of the image processing apparatus according to a second embodiment of the invention.

In FIG. 8, the same numerals are given to portions corresponding to the first embodiment and explanation thereof will be omitted.

The image processing apparatus 1 is configured in the same manner as FIG. 1 except that a user input unit 20 is newly provided.

In the second embodiment, the image processing result by Michelson contrasts C automatically adjusted (without input by the user) in the same manner as the first embodiment is outputted at first. Then, after confirming the image processing result by the automatic adjustment, the user himself/herself can change the Michelson contrasts C according to need.

The user input unit 20 receives input of the Michelson contrast C as the depth adjustment amount set by the user and supplies the value to the contrast adjustment unit 17.

The contrast adjustment unit 17 allows the image output unit 19 to output an image for confirming whether the Michelson contrast C is changed or not after the 3D image to which the contrast adjustment processing has been performed based on the predetermined depth adjustment amount is outputted from the image output unit 19. According to the processing, a confirmation screen for allowing the user to confirm whether the Michelson contrast C is changed or not is displayed on the subsequent display device and the like. The confirmation screen may be displayed by ODS on the 3D image to which the contrast adjustment processing has been performed based on the automatic adjustment.

The user confirms the 3D image obtained after the contrast adjustment processing based on the automatic adjustment and inputs a changed value of the Michelson contrast C by the user input unit 20 when determining to change the Michelson contrast C. The user input unit 20 supplies the changed value of the Michelson contrast C inputted by the user to the contrast adjustment unit 17.

When the changed value of the Michelson contrast C is supplied from the user input unit 20, the contrast adjustment unit 17 applies the changed value of the Michelson contrast C in preference to the Michelson contrast C which has been automatically adjusted. That is, the contrast adjustment unit 17 adjusts contrast components of the 3D luminance image based on the changed value of the supplied Michelson contrast C, not based on the adjustment amount of the Michelson contrast C based on the predetermined depth adjustment amount.

[Flowchart of Contrast Adjustment Processing]

Figure 9:
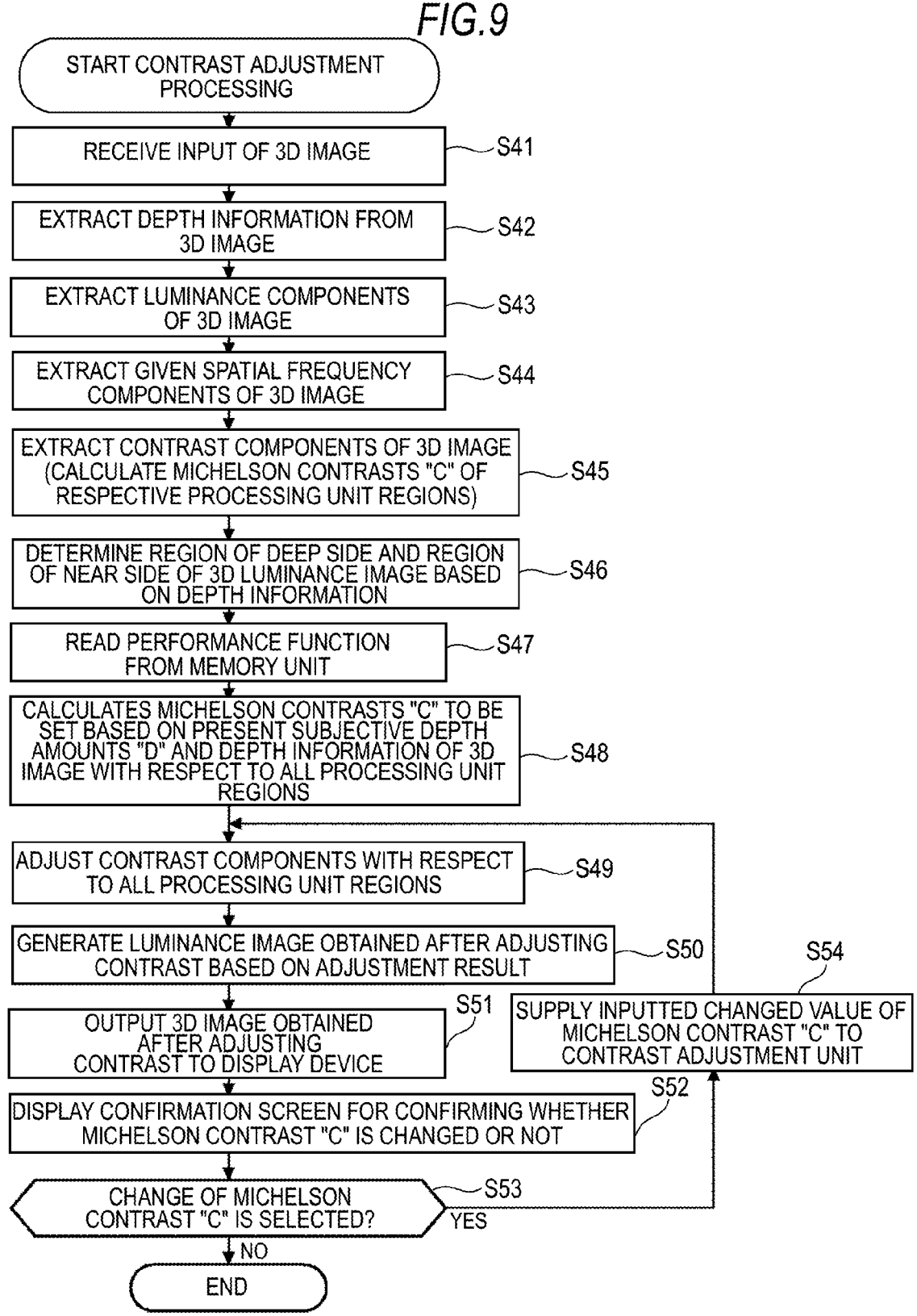
FIG. 9 is a flowchart for explaining contrast adjustment processing performed by the information processing apparatus of FIG. 8.

The contrast adjustment processing of the image processing apparatus 1 according to the second embodiment will be explained with reference to a flowchart of FIG. 9.

Figure 3:
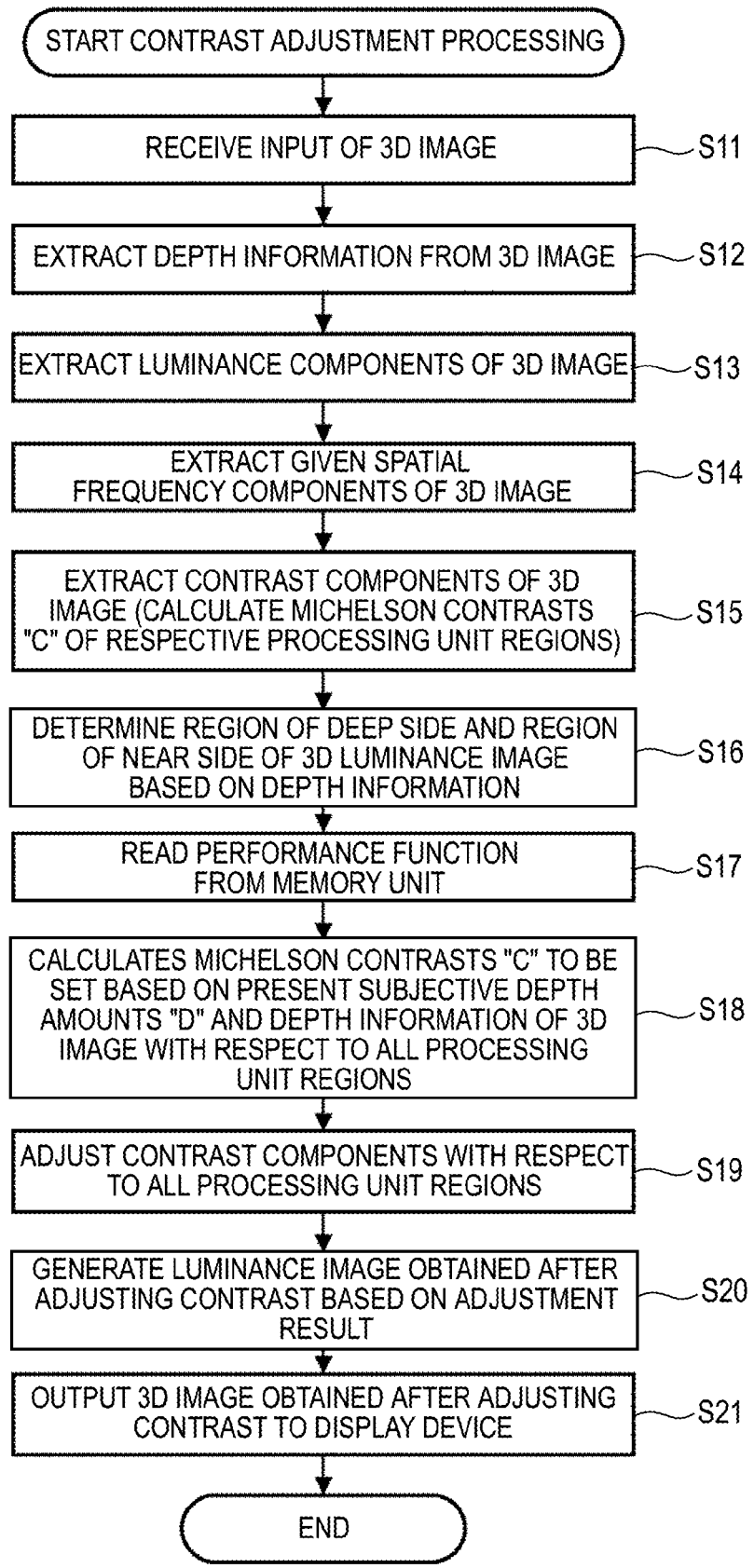
FIG. 3 is a flowchart for explaining contrast adjustment processing performed by the image processing apparatus of FIG. 1.

Processing from Step S41 to Step S51 is the same as the above processing from Step S11 to S21 of FIG. 3, therefore, explanation thereof is omitted. That is, the 3D image in which luminance values have been changed by the Michelson contrasts C determined by the contrast adjustment unit 17 is displayed on the subsequent display device and the like at first.

Then, in Step S52, the contrast adjustment unit 17 allows the image output unit 19 to output an image to be confirmed whether the Michelson contrast C is changed or not and displays the confirmation screen for confirming whether the Michelson contrast C is changed or not on the subsequent display device and the like.

In Step S53, the contrast adjustment unit 17 determines whether the change of the Michelson contrast C has been selected or not by the user input unit 20. The selection information by the user concerning the presence of change of the Michelson contrast C is supplied from the user input unit 20 to the contrast adjustment unit 17.

When the change of the Michelson contrast C is selected, the changed value of the Michelson contrast C is also supplied from the user input unit 20 to the contrast adjustment unit 17.

When the change of the Michelson contrast C is not selected in Step S53, the processing is ended.

On the other hand, when the change of the Michelson contrast C is selected in Step S53, the processing proceeds to Step S54. In Step S54, the user input unit 20 supplies the changed value of the Michelson contrast C which has been inputted by the user to the contrast adjustment unit 17.

After Step S54, the processing returns to Step S49. In Step S49, the contrast adjustment unit 17 adjusts contrast components so that the Michelson contrasts C are changed to be changed values supplied from the user input unit 20 with respect all processing unit regions included in the deep side region and the near side region. The processing after Step S50 is the same.

According to the contrast adjustment processing as described above, after confirming the image processing result by the Michelson contrasts C which has been automatically adjusted, the user himself/herself can further change the Michelson contrast C according to need.

Accordingly, it is possible to adjust contrast components for enhancing the depth sense of the 3D image in which user's taste is reflected.

It is also preferable to allow the user to select items such as "to increase the depth sense" and "to reduce the depth sense" and to apply the amount previously set so as to correspond to the item (for example, 1.5 times of the value determined by the automatic adjustment) as the changed value of the Michelson contrast C.

According to the image processing apparatus 1 to which the invention is applied, the depth sense of the 3D image can be enhanced by using the performance function obtained by quantifying visual sense characteristics of human beings by visual experiments. Specifically, the depth sense of the 3D image can be enhanced by using the performance function obtained by quantifying the relation between the Michelson contrast C and the depth amount D perceived subjectively by contrast. Contrast belongs to monocular 3D information in binocular 3D information and monocular 3D information for allowing a human being to perceive stereoscopic effect and depth of an object. Therefore, it is possible to enhance the depth sense of the 3D image by adjusting parameters of contrast which is one of monocular 3D information based on visual sense characteristics of human beings according to the image processing apparatus 1.

Also according to the image processing apparatus 1, the depth sense of the 3D image can be enhanced by changing contrast, therefore, it is possible to reduce binocular parallax which is one of binocular 3D information due to the change. In the case, the binocular parallax is small when comparing with a 3D image allowing the user to perceive the same depth sense only by binocular parallax without changing contrast, therefore, "the convergence position and the adjustment position of eyeballs" explained in the column of "Description of related art" come close to each other. Therefore, it is possible to reduce the viewer's perception of artificiality, discomfort or visual fatigue. That is, the 3D image with lesser sense of discomfort or uncomfortable feeling for human beings can be provided by adjusting parameters of contrast and enhancing the depth sense of the 3D image. In other words, it is possible to provide the 3D image with lesser sense of discomfort or uncomfortable feeling for human beings by combining monocular 3D information with binocular 3D information.

The above series of processing can be executed by hardware as well as by software. When the series of processing is executed by software, programs included in the software are installed in a computer. Here, the computer includes a computer incorporated in dedicated hardware, a general-purpose personal computer which can execute various functions by installing various types of programs and the like.

Figure 10:
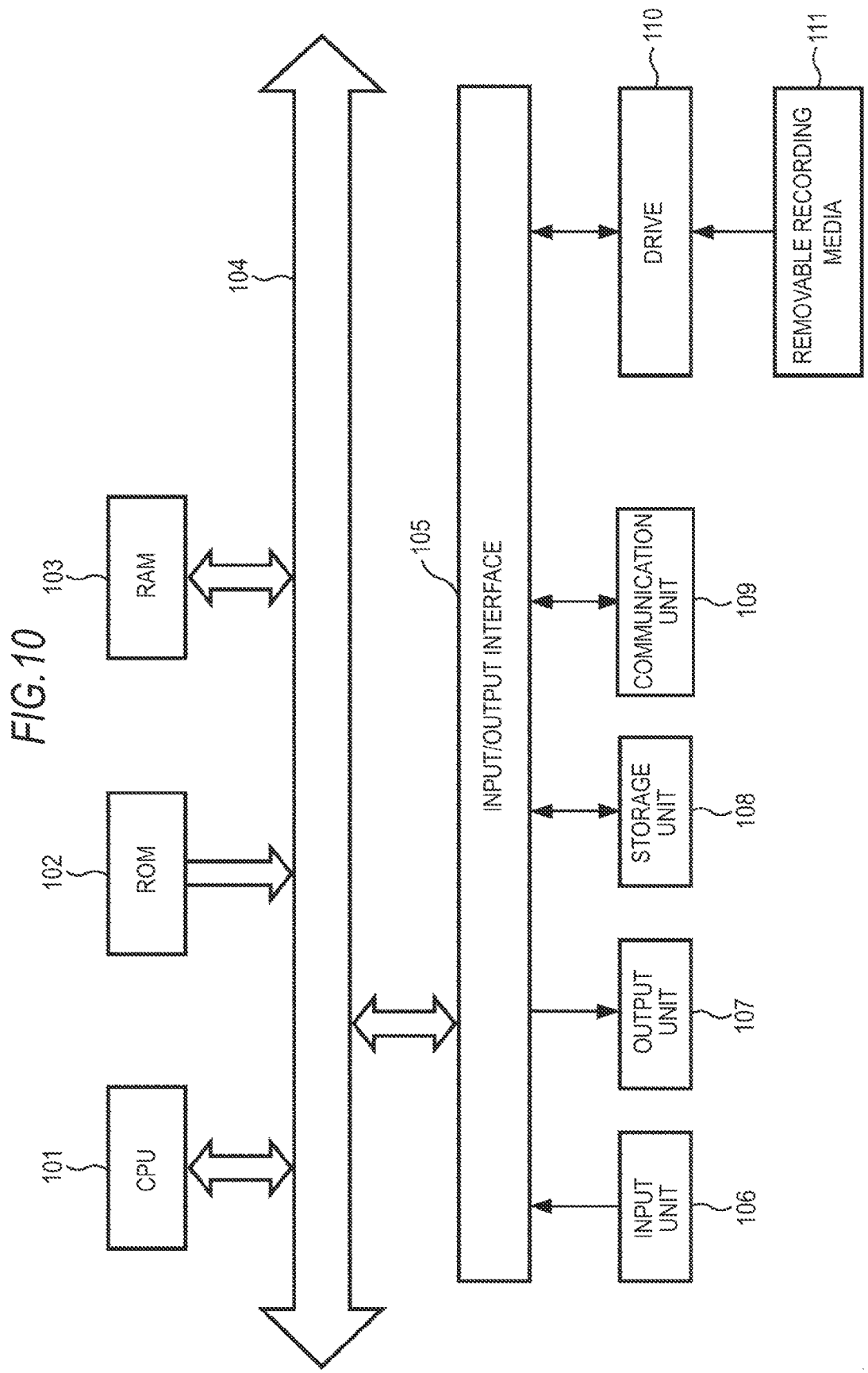
FIG. 10 is a block diagram showing a configuration example of a computer according to an embodiment of the invention.

FIG. 10 is a block diagram showing a configuration example of hardware of a computer executing the above series of processing by programs.

In the computer, a CPU (Central Processing Unit) 101, a ROM (Read Only Memory) 102 and a RAM (Random Access Memory) 103 are mutually connected by a bus 104.

An input/output interface 105 is further connected to the bus 104. To the input/output interface 105, an input unit 106, an output unit 107, a storage unit 108, a communication unit 109 and a drive 110 are connected.

The input unit 106 includes a keyboard, a mouse, a microphone and the like. The output unit 107 includes a display, a speaker and the like. The storage unit 108 includes a hard disk, a nonvolatile memory and the like. The communication unit 109 includes a network interface and the like. The drive 110 drives removal recording media 111 such as a magnetic disk, an optical disk, a magneto-optical disk or a semiconductor memory.

In the computer configured as described above, the CPU 101 loads programs stored in, for example, the storage unit 108 to the RAM 103 through the input/output interface 105 and the bus 104 and executes the programs, thereby performing the above series of processing.

The programs executed by the computer (CPU 101) can be provided by being recorded in the removal recording media 111 as packaged media. The programs can be also provided through wired or wireless transmission media such as a local area network, Internet, digital satellite broadcasting and so on.

In the computer, programs can be installed in the storage unit 108 through the input/output interface 105 by mounting the removal recording media 111 on the drive 110. Programs can be received by the communication unit 109 and installed in the storage unit 108 through wired or wireless transmission media. Additionally, programs can be previously installed in the RAM 102 or the storage unit 108.

Programs executed by the computer may be programs processed in time series along the order explained by the present specification, or maybe programs processed in parallel or processed at necessary timing such as when calling is performed.

The embodiment of the invention is not limited to the above embodiments and can be variously changed within a scope not departing from the gist of the invention.

The present application contains subject matter related to that disclosed in Japanese Priority Patent Applications JP 2009-270077 filed in the Japan Patent Office on Nov. 27, 2009, the entire contents of which is hereby incorporated by reference.

What is claimed is:

1. An image processing apparatus comprising:
   a depth information extraction means to extract depth information from an input 3D image;
   a luminance extraction means to extract luminance components of the inputted 3D image;
   a contrast extraction means to extract contrast components of the inputted 3D image based on the luminance components of the inputted 3D image extracted by the luminance extraction means;
   a storage means to store a performance function indicating relation between the contrast components of the inputted 3D image and depth amounts subjectively perceived, which is determined based at least in part on visual sense characteristics of human beings; and
   a contrast adjustment means to calculate present depth amounts of the inputted 3D image from the contrast components of the inputted 3D image extracted by the contrast extraction means based at least in part on the performance function with respect to region of the inputted 3D image which are determined from the depth information extracted by the depth information extraction means and adjusting contrast components of the inputted 3D image based at least in part on the calculated present depth amounts and a set depth adjustment amount.

2. The image processing apparatus according to claim 1, wherein the contrast adjustment means calculates contrast components for allowing the calculated present depth amounts to be the set depth adjustment amount and adjusts the contrast components of the inputted 3D image so as to be the calculated contrast components.

3. The image processing apparatus according to claim 1, further comprising:
a spatial frequency extraction means to extract spatial frequency components of the inputted 3D image,
wherein the storage means stores the performance functions according to given frequency components, and
the contrast adjustment means applies the performance function corresponding to the extracted frequency components of the inputted 3D image.

4. The image processing apparatus according to claim 3, further comprising:
a depth adjustment amount input means to receive input of the depth adjustment amount.

5. The image processing apparatus according to claim 4, wherein the contrast extraction means calculates Michelson contrasts of the inputted 3D image as contrast components of the inputted 3D image.

6. The image processing apparatus according to claim 5, wherein the performance function is represented by:

$$D = A \times \log(C) + B \; (A, B \text{ are constant numbers}),$$

when the Michelson contrast is C and the depth amount is D.

7. The image processing apparatus according to claim 5, wherein the performance function is represented by:

$$D = D_{amp} \times \frac{C^n}{C^n + C_{50}^n} + D_{min} \quad (5)$$

($D_{amp}$, $D_{min}$, $C_{50}$ and "n" are given constant numbers)
when the Michelson contrast is C and the depth amount is D.

8. An image processing method of an image processing apparatus storing a performance function indicating a relation between contrast components of an inputted 3D image and depth amounts subjectively perceived, which is determined based at least in part on visual sense characteristics of human beings and performing adjustment of depth sense of the inputted 3D image, comprising the steps of:
extracting depth information from the inputted 3D image;
extracting luminance components of the inputted 3D image;
extracting contrast components of the 3D image based at least in part on the extracted luminance components of the inputted 3D image;
calculating present depth amounts of the inputted 3D image from the contrast components of the inputted 3D image based at least in part on the performance function with respect to region of the inputted 3D image which are determined from the extracted depth information; and
adjusting contrast components of the inputted 3D image based at least in part on the calculated present depth amounts and the set depth adjustment amount.

9. A non-transitory computer readable medium on which a program is stored which when executed by a computer causes the computer to execute processing of:
extracting depth information from an inputted 3D image,
extracting luminance components of the inputted 3D image,
extracting contrast components of the 3D image based at least in part on the extracted luminance components of the inputted 3D image,
calculating present depth amounts of the inputted 3D image which are subjectively perceived from the extracted contrast components of the inputted 3D image based at least in part on a performance function indicating relation between contrast components of the inputted 3D image and the depth amounts subjectively perceived, which is determined based at least in part on visual sense characteristics of human beings with respect a region of the inputted 3D image which are determined from the extracted depth information, and
adjusting contrast components of the inputted 3D image based at least in part on the calculated present depth amounts and a set depth adjustment amount.

10. An image processing apparatus comprising:
an extraction means to extract contrast components of an input image; and
an adjustment means to calculate depth amounts from the extracted contrast components based at least in part on a performance function and adjusting the contrast components of the input image based at least in part on the depth amount and a set depth adjustment amount,
wherein the extraction means calculates Michelson contrasts of the input image, and the performance function is represented by $$D = A \times \log(C) + B \; (A, B \text{ are constant numbers})$$

when the Michelson contrast is C and the depth amount is D.

11. An image processing apparatus comprising:
a depth information extraction unit configured to extract depth information from an input 3D image;
a luminance extraction unit configured to extract luminance components of the inputted 3D image;
a contrast extraction unit configured to extract contrast components of the inputted 3D image based at least in part on the luminance components of the inputted 3D image extracted by the luminance extraction unit;
a storage unit configured to store a performance function indicating relation between the contrast components of the inputted 3D image and depth amounts subjectively perceived, which is determined based at least in part on visual sense characteristics of human beings; and
a contrast adjustment unit configured to calculate present depth amounts of the inputted 3D image from the contrast components of the inputted 3D image extracted by the contrast extraction unit based at least in part on the performance function with respect to a region of the inputted 3D image which are determined from the depth information extracted by the depth information extraction unit and adjust contrast components of the inputted 3D image based at least in part on the calculated present depth amounts and a set depth adjustment amount.

* * * * *